JAMES HARRIS.

Improvement in Cultivators.

No. 4,813. Reissued March 19, 1872.

Witnesses.
C. F. Brown.
Rud. W. Lacy

Inventor.
James Harris by
H. W. Beadle. atty.

UNITED STATES PATENT OFFICE.

JAMES HARRIS, OF JANESVILLE, WISCONSIN.

IMPROVEMENT IN CULTIVATORS.

Specification forming part of Letters Patent No. 87,101, dated February 23, 1869; reissue No. 4,813, dated March 19, 1872.

DIVISION B.

Be it known that I, JAMES HARRIS, of the city of Janesville, in the county of Rock and the State of Wisconsin, have invented certain new and useful Improvements in Cultivators; and I do hereby declare that the following is a full, clear, and exact description thereof, reference being had to the accompanying drawing making a part of this specification, in which—

Figure 1:
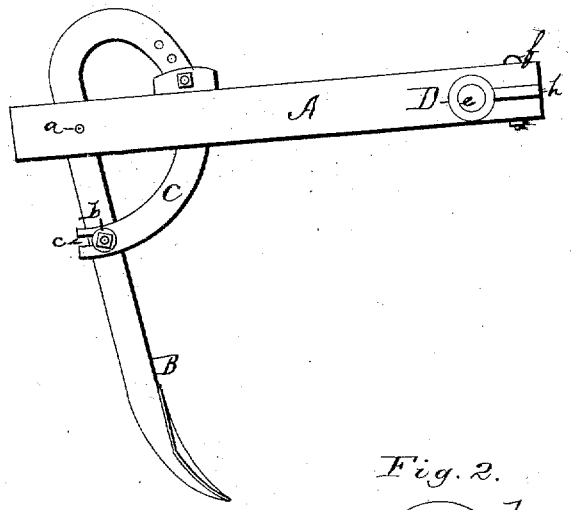
Figure 3:
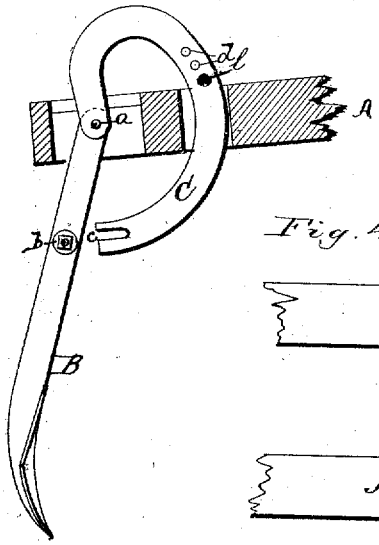
Figure 2:
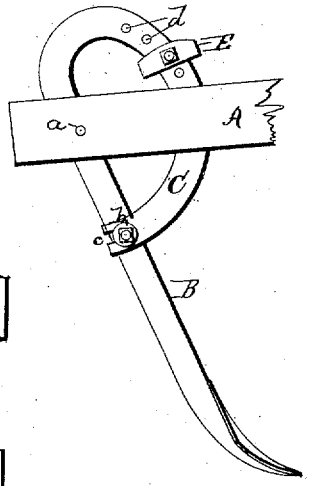
Figure 4:
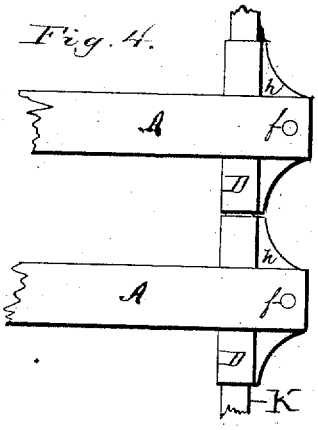

Figure 1 is a side view or elevation of the drag-bar and tooth or shovel of a cultivator as I construct them, and as they appear when in use. Fig. 2 is also a side view or elevation of the same as they appear when the cultivator is backing. Fig. 3 is a longitudinal vertical section of the same as they appear when the tooth has been released by coming in contact with an obstruction; and Fig. 4 is a top view of a portion of two drag-bars, showing their position in connection with the draft-rod.

The last feature, however, is described and claimed in Division A.

The nature of my invention relates to the teeth and drag-bars of cultivators; and consists in connecting the shank of the tooth to an independent circle-iron, when constructed and used in connection with the drag-bar, substantially as and for the purpose hereinafter described.

To enable others skilled in the art to make and use my invention, I will now proceed to describe fully its construction and operation.

In the drawing, A represents a drag-bar of wood or other suitable material; B, the tooth; C, the circle-iron; and D, the elongated metallic box, joining the drag-bar A to the draft-rod K, Fig. 4. The tooth at the end of the shank, and the circle-iron at its upper end, have a common bearing on the pivot-pin *a* that passes through the drag-bar. The lower end of the circle-iron is joined to the shank of the tooth by a safety-coupling, *b*. This safety-coupling consists of a simple bolt passing through the shank, and also through a slot, *c*, in the circle-iron. On the end of the bolt is a washer, larger than the width of the slot, and a nut to clamp them together. The bolt may be in the circle-iron, and the slot in a flange or short ear on the shank, if desired; or a bolt staple in the shank clasping around the circle-iron, and dispensing with the slot, may be used. To set the teeth or to give them the desired pitch or inclination, I pierce the circle-iron with a series of holes, *d*, through either of which the setting device E may be secured. This setting device may consist of a bolt and square-faced lugs, as shown, or of the simple pin *l*, shown in Fig. 3. In the latter case, the upper face of the drag-bar (if of wood) should be covered with a metallic plate, to prevent the pin from indenting the wood.

It will be seen that the adjustable setting device E secures without change, when once set, the pitch or inclination of the teeth, and allows them to swing forward, as shown in Fig. 2, when the cultivator is backed. It will also be seen that the safety-coupling *b* holds the teeth with an adjustable force, and when once the tooth is drawn back by an obstruction the short distance necessary to withdraw the bolt from the slot *c*, the tooth is not still held by the coupling, but is entirely free; also, that the freeing or loosening of the tooth does not affect the previous setting of its pitch or inclination, which remains unchanged, however, after the tooth may be loosened.

What I claim is—

1. The detached or independent circle-iron C.

2. The arrangement of the detached circle-iron C with the tooth B, whereby both have a common bearing on the pivot-pin *a*, substantially as described.

3. The combination of the tooth B, circle-iron C, and coupling device *b*, substantially as described.

4. The arrangement of the tooth B, independent circle-iron C, setting device E, and drag-bar A, substantially as and for the purpose described.

JAMES HARRIS.

Witnesses:
A. H. SHELDON,
L. L. ROBINSON.